United States Patent
Alladi et al.

(10) Patent No.: US 12,519,739 B1
(45) Date of Patent: Jan. 6, 2026

(54) REAL-TIME ENGAGEMENT ENGINE FOR DIGITAL CONNECTIONS

(71) Applicant: Morgan Stanley Services Group Inc., New York, NY (US)

(72) Inventors: Srinivas Alladi, Princeton Junction, NJ (US); Manoj Arora, East Brunswick, NJ (US); Anshul Chaudhary, Cumming, GA (US); Ankita Joshi, Karnataka (IN); Suvina Mathur, Johns Creek, GA (US); Amarendra Kumar Mishra, East Brunswick, NJ (US); Apurv Shah, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/065,248

(22) Filed: Feb. 27, 2025

(51) Int. Cl.
*H04L 47/80* (2022.01)
*H04L 9/40* (2022.01)
*H04L 47/78* (2022.01)

(52) U.S. Cl.
CPC .......... *H04L 47/801* (2013.01); *H04L 47/788* (2013.01); *H04L 47/808* (2013.01); *H04L 63/083* (2013.01)

(58) Field of Classification Search
CPC .................. G06N 5/00; G06N 5/04
See application file for complete search history.

(56) References Cited

U.S. PATENT DOCUMENTS

| | | | |
|---|---|---|---|
| 9,438,604 B1* | 9/2016 | Addala | H04L 63/0853 |
| 11,818,119 B1* | 11/2023 | Dayan | H04L 63/083 |
| 11,902,285 B2* | 2/2024 | Spurlock | H04L 63/1416 |
| 2018/0097840 A1* | 4/2018 | Murthy | H04L 63/02 |
| 2020/0076918 A1* | 3/2020 | Chen | H04L 67/1055 |
| 2020/0092298 A1* | 3/2020 | Ojha | H04L 67/06 |
| 2020/0265062 A1* | 8/2020 | Srinivasan | G06F 9/4416 |
| 2021/0084031 A1* | 3/2021 | Lao | H04L 63/029 |
| 2021/0136577 A1* | 5/2021 | Liu | H04W 76/10 |
| 2024/0214352 A1* | 6/2024 | Teo | H04L 67/025 |

* cited by examiner

*Primary Examiner* — Chirag R Patel
(74) *Attorney, Agent, or Firm* — Leason Ellis LLP

(57) ABSTRACT

Computer-implemented systems and methods are provided for matching in real-time across at least one network resource. A request for access to a network resource is received, which comprises a credential authorizing the access to the network resource. The request is authenticated by comparing the credential with information stored in a database. Further, a user identifier is accessed that has been assigned for the user. Eligibility criteria stored in a database and associated with each of a plurality of assigned user identifiers are accessed. The eligibility criteria define user access to respective network resources. Moreover, by processing the eligibility criteria, a plurality of network resources defined for the assigned user identifier can be determined and one of the plurality of network resources defined for the assigned user identifier selected. Interaction between the user and the selected one of the plurality of network resources is facilitated.

20 Claims, 12 Drawing Sheets

REAL-TIME ENGAGEMENT ENGINE FOR DIGITAL CONNECTIONS

FIELD

The present disclosure relates, generally, to computing technology and, more particularly, network resource management across a plurality of modules and environments.

BACKGROUND

The ability to manage and optimize user interactions in enterprise network systems has become increasingly difficult. Reliance on complex, time-consuming processes to authenticate user requests, locate appropriate resources, and provide access thereto in response can lead to delays and missed engagement opportunities. Furthermore, integration between devices in disparate systems can be disjointed and slow due to technical bottlenecks, which further hinders the ability to satisfy immediate needs of users.

Accordingly, there is a need to effectively manage criteria and conditions associated with user interactivity in large network environments, including to provide timely and relevant access to resources. It is with respect to these and other considerations that the disclosure made herein is presented.

BRIEF SUMMARY

In one or more implementations, computer-implemented systems and methods are provided for matching in real-time across at least one network resource. At least one computing device configured with processor-executed programming instructions receives, from at least one other computing device operated by a user, a request for access to a network resource. The request comprises a credential authorizing the access to the network resource. The at least one computing device authenticates the request by comparing the credential with information stored in a database. Further, the at least one computing device accesses a user identifier that has been assigned for the user and accesses eligibility criteria stored in a database and associated with each of a plurality of assigned user identifiers. The eligibility criteria define user access to respective network resources. Moreover, the at least one computing device determines, by processing the eligibility criteria, a plurality of network resources defined for the assigned user identifier. The at least one computing device selects one of the plurality of network resources defined for the assigned user identifier and facilitates interaction between the user and the selected one of the plurality of network resources.

In one or more implementations, the at least one computing device implements a rules engine that utilizes stored rules for processing the request based on at least one lead source associated with the request and the selected one of the plurality of network resources.

In one or more implementations, the at least one computing device maintains a retry queue that captures failed requests, wherein the retry queue attempts to resend the failed requests multiple times to ensure they are processed successfully.

In one or more implementations, the at least one computing device logs all interaction data in a transaction logging database, wherein the logged data comprises user identifiers, details of processed requests, details of network resource selections made, the eligibility criteria utilized, and the timestamps of each operation for future reference and auditing.

In one or more implementations, the at least one computing device applies artificial intelligence to suggest one of the plurality of network resources for the assigned user identifier.

In one or more implementations, the at least one computing device implements a continuous improvement feedback loop with artificial intelligence capabilities, wherein feedback regarding performance of the network resources is collected and utilized to update the eligibility criteria stored in the database.

In one or more implementations, the at least one computing device sends alerts to relevant applications when specific events occur, wherein the notifications are based on the actions taken on the requests, such as successful selections and interactions facilitated or failures in processing.

In one or more implementations, the at least one computing device analyzes historical interaction data associated with the user identifiers to identify patterns and improve the effectiveness of network resource assignments and user engagements based on past interactions.

In one or more implementations, the at least one computing device outputs, via at least one data transmission output, the results of the network resource selection process to one or more of a notification service, logging database, or external API for further processing.

In one or more implementations, the selected network resource is chosen based on defined criteria that comprise a consideration of historical success rates of past interactions through respective network resources employed for different user identifiers.

The details of these and implementations are set forth in the accompanying drawings and the description below.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

By way of summary and introduction, the present disclosure regards inventive subject matter covering computer-implemented systems and methods for real-time matching between at least one user and at least one network resource. As used herein, the term "network resource" refers, generally, to any hardware, software, service, or system component that facilitates user interactions and supports data exchange within a digital network environment, including but not limited to servers, databases, applications, APIs, and communication interfaces that can be accessed and utilized by users, advisors, customer service representatives, internal systems, or external systems, for various operational or engagement purposes. Systems and methods disclosed herein comprise a series of steps executed by computing devices to facilitate user access to network resources. For example, functionality is provided for authenticating requests by comparing user credentials against stored information, accessing a unique user identifier, and by retrieving eligibility criteria that dictate access rights across various resources. Such processes enable one or more computing devices to identify a range of network resources that can be tailored to a user's pre-assigned identifier, including as a function of machine learning, artificial intelligence ("AI") and algorithms that can be applied for suggesting and selecting one or more suitable options for efficient and successful user interaction.

In one or more implementations, a computer implemented architecture is provided that is configured to improve efficiency of processes, such as assigning network resources and enhancing network user experiences. For example, a transition can be implemented from a traditional batch processing model to an event-driven API framework, which significantly reduces latency and supports substantially real-time responses to user requests. This advancement minimizes the delay in user interactions and automates processes that otherwise would have to be performed manually, which leads to a faster and streamlined engagement journey. The integration of intelligent systems and machine learning models allows for a more responsive and adaptive framework and network resource selection, ensuring that users connect promptly and effectively with respective network resources. Overall, this disclosure addresses critical aspects of customer engagement in network matching services by facilitating timely and efficient interactions.

Figure 1:
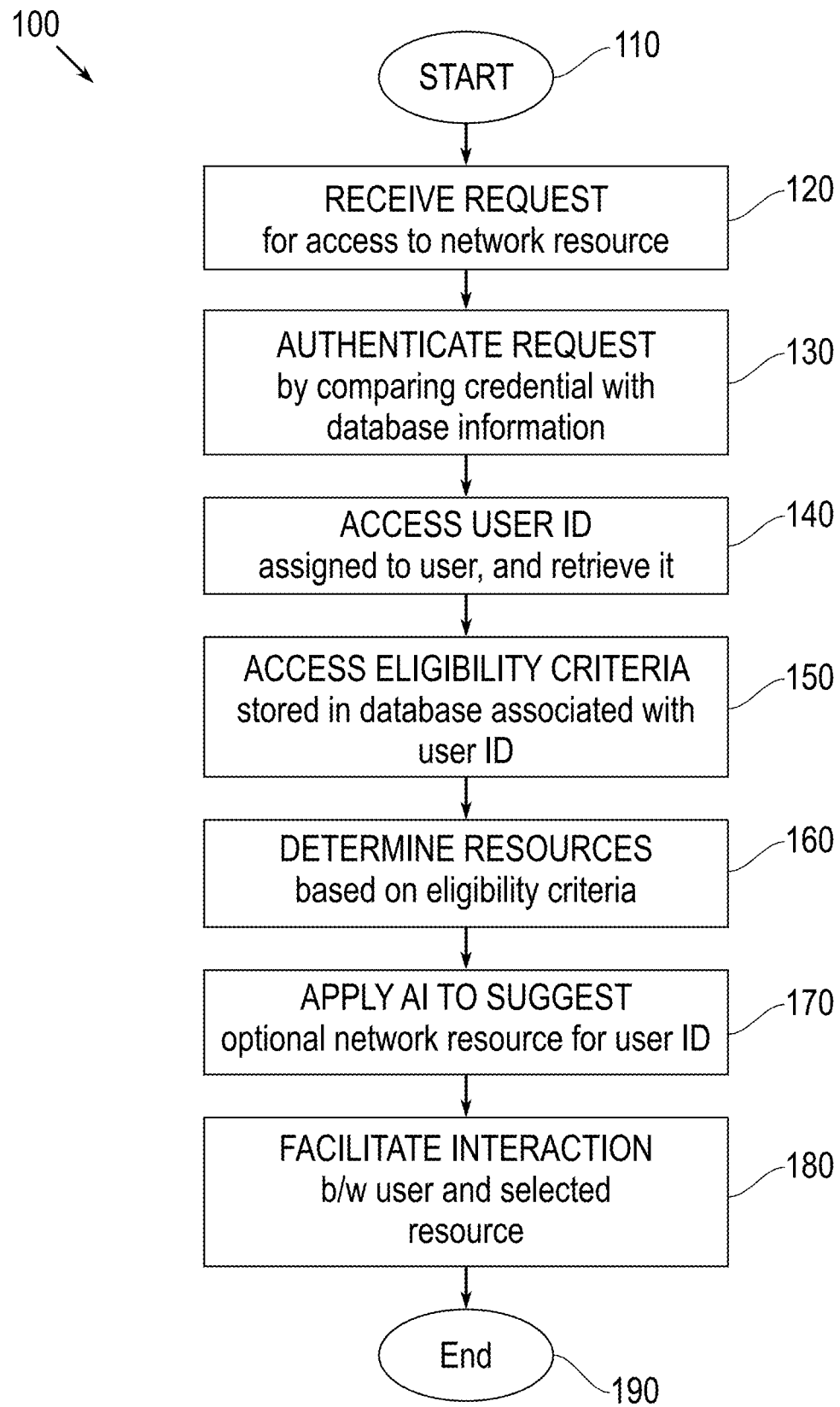
FIG. 1 is a flow chart illustrating a high-level process flow associated with an example implementation of the present disclosure.

Referring now to the drawings, FIG. 1 is a flow chart 100 illustrating example steps in a high-level process flow associated with an implementation of the present disclosure. In the example shown in FIG. 1, a computer-implemented method is provided for matching substantially in real-time and across multiple network resources. In one or more arrangements, the method comprises the step of receiving 120, by at least one computing device configured with processor-executed programming instructions from at least one other computing device operated by a user, a request for access to a network resource. The request can comprise a credential authorizing access to the network resource. In various arrangements, the method further comprises the step of authenticating 130 the request by the at least one computing device, which can involve comparing a user credential with information stored in a database.

Continuing with reference to FIG. 1, the at least one computing device can perform the step of accessing 140 a user identifier that has been previously assigned for the user. Further, the at least one computing device can access 150 eligibility criteria, for example, that is stored in a database and associated with each of a plurality of assigned user identifiers. In one or more implementations, the eligibility criteria can define user access to respective network resources. In one or more implementations, the method comprises the step of determining 160, by the at least one computing device processing the eligibility criteria, a plurality of network resources defined for the assigned user identifier takes place.

In particular arrangements, the method further comprises the step of applying 170, by the at least one computing device, artificial intelligence to suggest selection of one of the plurality of network resources defined for the assigned user identifier. The method further comprises the step of facilitating 180, by the at least one computing device, interaction between the user and a selected one of a plurality of network resources. At step 190, the process ends.

Figure 2:
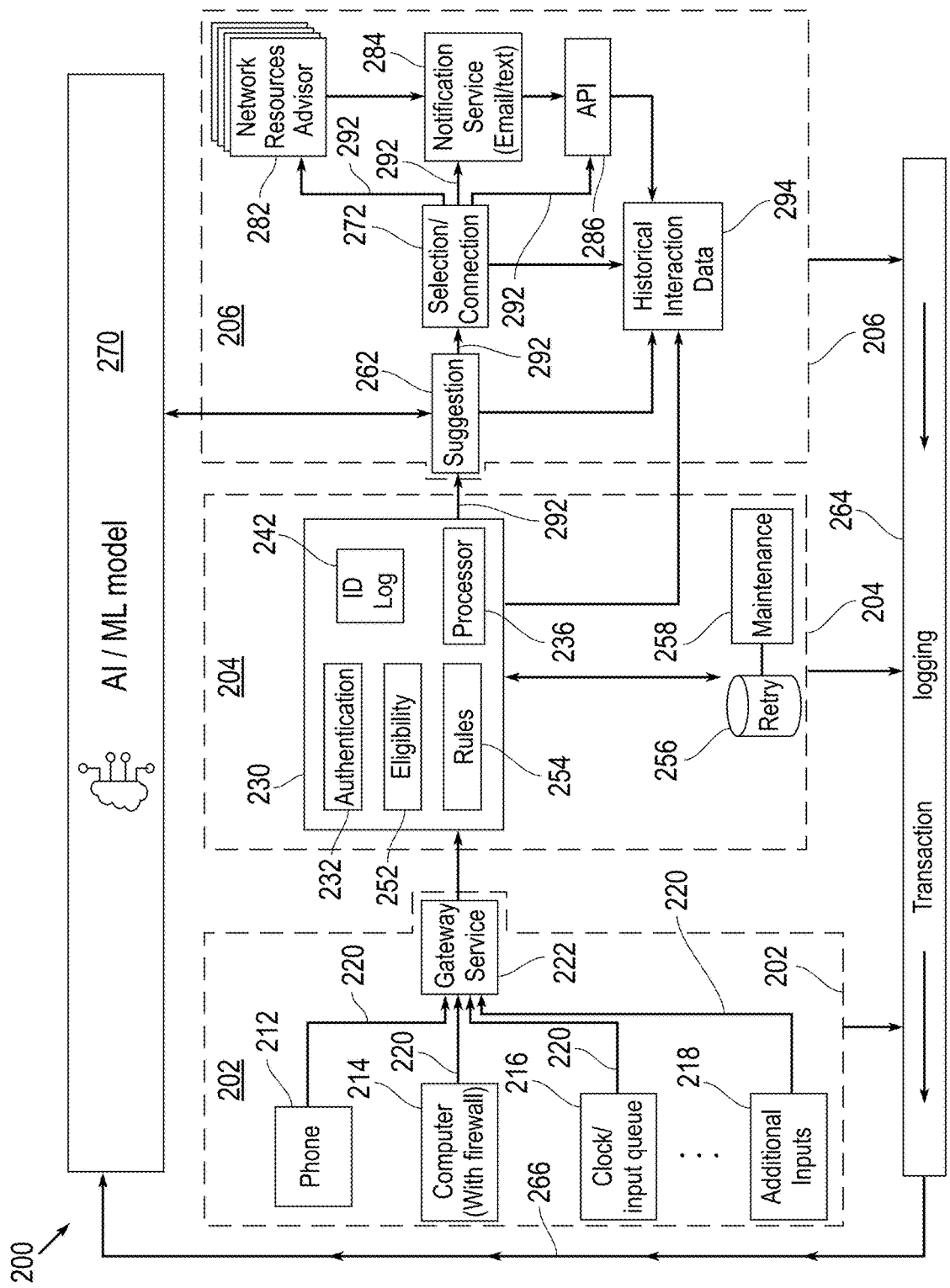
FIG. 2 shows a high-level overview of components, comprising inputs and outputs, a computing device to facilitate network resource selection and interaction, and an artificial intelligence ("AI") model in accordance with an example implementation of the present disclosure.

FIG. 2 shows a high-level overview 200 of components in an example implementation of the present disclosure, comprising inputs 220 and outputs 292, a computing device 230 to facilitate network resource selection and interaction, and an artificial intelligence ("AI") model 270.

With respect to the step of receiving 120 (FIG. 1), a request for access to a network resource can be received from at least one other computing device operated by a user, by at least one computing device 230 configured with processor executing programming instructions 236. The at least one computing device operated by a user can be configured with firewall capabilities, and can be a phone 212, a computer 214, a request scheduling queue 216, or additional input modes 218. In some implementations, a computing device operated by a user leads to a gateway input aggregation service 222 through one or more inputs 220. In some implementations, the gateway input aggregation service 222 ensures requests are routed to correct system endpoints. The gateway input aggregation service 222 is also, in some cases, capable of load balancing by confirming efficient request routing to avoid bottlenecks. In one or more implementations, the one or more inputs 220 can transmit the request for access to a network resource to the at least one computing device 230 for processing, either through the gateway input aggregation service 222 or directly.

With respect to the step of authenticating 130 (from FIG. 1), the request for network access can comprise a credential which authorizes access to the network resource. The step of authenticating 130 the request, by the at least one computing device 230, can involve comparing the credential with information stored in an authentication database 232. Further, the method shown in FIG. 2 comprises the step of accessing 140 (from FIG. 1), by the at least one computing device 230, a user identifier that has been previously assigned to the user. The user identifier can be stored in an ID log database 242, for which a computing device can access, as well as the authentication database 232. Such access can be facilitated, for example, by code executing in processor 236 within the computing device 230. In some implementations, authenticating 130 occurs on a private cloud. This private cloud for authenticating can have one or more of the following features: the ability to authenticate anonymous requests; the ability to bypass an unsecure endpoint; the ability to enrich user claims (such as RACF IDs, Short names, and Firmwide IDs); and the ability to invoke downstream services with appropriate security claims.

In one or more variations, process 200 includes the step of accessing 150 (as in FIG. 1), by the at least one computing device, eligibility criteria stored in an eligibility criteria database 252 and associated with each of a plurality of assigned user identifiers is also part of the method. In some implementations, the eligibility criteria define user access to respective network resources, such as via outputs 292. The eligibility criteria, user identifiers, and authentication information can be stored in a single database. In some arrangements, the eligibility criteria database 252, the ID log database 242, and the authentication database 232 are all separate databases.

Continuing with reference to FIG. 2, process 200 additionally comprises the step of determining 160 (FIG. 1), by the at least one computing device 230 processing the eligibility criteria, a plurality of network resources 282 and respective outputs 292 defined for a user associated with the assigned user identifier. In particular arrangements, the method further comprises the step of applying 170 (FIG. 1), by the at least one computing device 230, an AI model 270 that is usable to suggest the selection of one of the plurality of network resources 282 and respective outputs 292 defined for the assigned user identifier. In some implementations, the AI model is a machine learning ("ML") model. In some implementations, the computing device 230 is in electronic communication with data channels/databases and can gather information to be processed for making selections and updates. Intelligent proprietary machine learning or other AI models can be used for the determining step 160. This can include use of an output value from such a model as a filter based on thresholds to determine eligibility of an incoming requests, or for further assignment steps. Further, inputs and outputs to the computing device 230 can be stored in a transaction logging database 264 which, when accessed by one or more computing devices, can enable a bidirectional relationship as data are utilized for future calls to the computing device 230, including for validation and checks. Additionally, some systems consistent with the present disclosure keep the network resource 282 matching function informed about the selections made, enabling further notifications to be dispatched to network resources 282 and visualizing the selections accordingly.

In one or more implementations, the AI model 270 is a machine learning model. In one or more implementations, computing device 230 facilitates communication between the AI model 270 and an output stage 206. In some implementations, systems and methods disclosed herein also support communication between one or more of an input stage 202, a processing stage 204, and an output stage 206. The AI model 270 can operate via computing device 230 to generate a suggested network resource via a suggestion service 262 for a network resource 282 to be selected for a particular user ID. In one or more implementations, the suggestion service 262 can be controlled by the computing device 230 and guided by the AI model 270. The suggestion service 262 can also have access to internal data to identify suitable network resources 282. A matching process can be based on various criteria, including proximity to the network resource 282, specific user identifier characteristics, and unique network resource parameters.

In various arrangements, the method 200 further comprises facilitating 180 (FIG. 1), by the at least one computing device 230, interaction between the user and the selected one of the plurality of network resources 282 through the respective outputs 292. The computing device 230 can, optionally with the assistance of the AI model 270, select 272 a network resource 282 for a particular user ID based on a suggestion 262 generated by the AI model 270. Thereafter, the computing device 230 can connect 272 the computing device associated with the user who made the initial network resource request to the selected network resource 282, such as through an output 292. Further, an additional output 292 can lead from a selection and connection module 272 to a delay queue, which delays the selection and connection to a network resource 282 for a customizable or predetermined amount of time.

Continuing with reference to FIG. 2, the method 200 can comprise accessing and/or providing, by the at least one computing device 230, a rules engine 254 that utilizes stored rules for processing incoming requests based on the defined eligibility criteria. In some implementations, the rules govern interaction between devices associated with input stage 202 and output stage 206, including network resources 282. The computing device 230 serves as the core component responsible for managing the rules engine 254, which determines the subsequent steps based on a variety of influencing factors. The computing device 230 logs all incoming and outgoing requests and instructions in the transaction logging database 264, thereby facilitating relatively easy path tracking for any request and aiding in debugging efforts, as needed. In some implementations, the computing device 230 interfaces with the rules engine 254 for adapting rules from upstream sources to determine whether to store data in real-time or via a queue, depending on the specific use case of interest.

In particular arrangements, the method 200 further comprises maintaining, by the at least one computing device 230, a retry queue 256 that captures failed requests. In various arrangements, the retry queue 256 attempts to resend the failed requests multiple times to ensure they are processed successfully. In some implementations, where a prior input mode 218 is unrecognized by the computing device 230, the retry queue 256 is capable of transmitting data about the new input mode 218 to a maintenance resource 258. In some implementations, the maintenance resource 258 is capable of integrating the new input mode 218 into a set of inputs accepted by the gateway input aggregation service 222. An example of one such additional input 218 is a batch queue for users or leads awaiting connection to network resources. This input type facilitates ASYNC bulk request processing capabilities that are pre-scheduled. Some implementations support bulk request processing in an asynchronous fashion from other systems (legacy, upstream, or external) via, for example, a KAFKA queuing service. Systems can send messages via PUB/SUB architecture to be processed in an asynchronous manner. Such bulk requests are then processed based on a comparison of, for example, data related to priority scheduling and resource availability.

In one or more variations, the method further comprises logging, by the at least one computing device 230, all interaction data in a transaction logging database 264. In some implementations, the logged data comprises timestamps, user identifiers, details of processed requests, details of network resource 282 selections made, the eligibility criteria utilized, and the timestamps of each operation for future reference and auditing. In one or more implementations, the interaction data logged in the transaction logging database 264 is used to further continuous improvement of the computer-implemented method for matching in real-time across multiple inputs and outputs.

In some implementations, all transactions and data transmissions within systems and methods consistent with the present disclosure utilize secure protocols and implement one or more of the following security measures: JSON Web Tokens for authorization, input validation, data encryption, and continuous logging to ensure compliance with privacy and other regulations. In some implementations, Application Programming Interfaces ("APIs"), like API 286, transmit data to or receive data from the computing device 230. Some of these APIs are designed as REST (representational state transfer) services, and they are accessed using secure HTTPS URLs. Modes of API access to the computing device 230 vary based on the specific user computing device used to initiate a request.

In various implementations, security features are implemented within the computing device 230 and network resource matching framework. These comprise one or more of the following: server-side authorization through JWT (JSON Web Token) authorization, and end-user authorization mechanisms utilizing OIDC (OpenID Connect) and OAuth2 protocols; data transfer encryption, specifically through the encryption of JSON data in transit utilizing TLS (Transport Layer Security) encryption protocols; and comprehensive auditing and logging measures, utilizing secure systems like Splunk and LaaS (Logging as a Service) to track and monitor all interactions and data handling processes effectively. In one or more implementations, and with respect to security measures, a system or method consistent with the present disclosure is designed to meet several non-functional requirements to ensure satisfactory performance and security. Authentication is, in some implementations, performed using a Sec Arch approved pattern, and authorization utilizes an Entitlement Provisioning & Reporting Tool (EPR). In multiple implementations, Lightweight Directory Access Protocol (LDAP) groups utilized for authorization are documented in an Access Control List (ACL).

In particular arrangements, the method further comprises implementing, by the at least one computing device 230, a continuous improvement feedback loop 266 with artificial intelligence capabilities, for instance through electronic communication with the AI model 270. In various arrangements, feedback regarding the performance of the network resources 282, the inputs 220, and the outputs 292 is collected and utilized to update the eligibility criteria stored in the eligibility criteria database 252. In one or more implementations, data from the transaction logging database 264 is used for the feedback loop 266. In some implementations, data from a historical interaction database 294 is used for the feedback loop 266. In additional implementations, data from both the transaction logging database 264 and historical interaction database 294 are used for the feedback loop 266. In one or more variations, and with respect to system and method continuous improvement and security, the WMDevops best practices for Site Reliability Engineering (SRE), tooling, and all aspects of development and operations are followed to achieve compliance, manage risk, and facilitate platform modernization. Furthermore, metrics related to dependency freshness, cybersecurity vulnerabilities (CVE), and other contemporary standards are analyzed, for instance by the computing device 230 and a feedback loop 266, to further improve a system and method consistent with the present disclosure.

Continuing with reference to FIG. 2, the method 200 further comprises sending, by the at least one computing device 230, alerts to relevant applications when specific events occur. The notifications can be based on actions taken on the requests, such as successful selections and interactions facilitated or, alternatively, failures in processing. In various arrangements, the method further comprises outputting, via at least one output 292, the results of the network resource 282 selection process 272 to one or more of a notification service 284 (optionally capable of providing alerts to relevant applications), a transaction logging database 264, or external API 286 for further processing.

The method 200 can further comprise analyzing, by the at least one computing device 230, historical interaction data associated with the user identifiers and optionally stored in a historical interaction database 294, to identify patterns. This analysis can improve the effectiveness of network resource selections, matches, and user engagements based on past interactions. For example, the selected network resource 282 and the corresponding output 292 can be chosen based on defined criteria. These criteria can comprise a consideration of historical success rates of past interactions through respective network resources employed for different user identifiers.

Continuing with reference to FIG. 2, SPLUNK logs can be utilized for error logging, and network resource 282 matching process quality monitoring employs tools, such as CHECKNANNY, APPDYNAMICS, JETSON, and others. In one or more implementations, a system or method consistent with the present disclosure supports advanced observability by employing standardized message formats, allowing for proactive monitoring and expedited incident resolution. In some implementations, a system or method consistent with the present disclosure also utilizes the most current information from internal systems to provide an informed selection of inputs to provide improved service to users.

Figure 3:
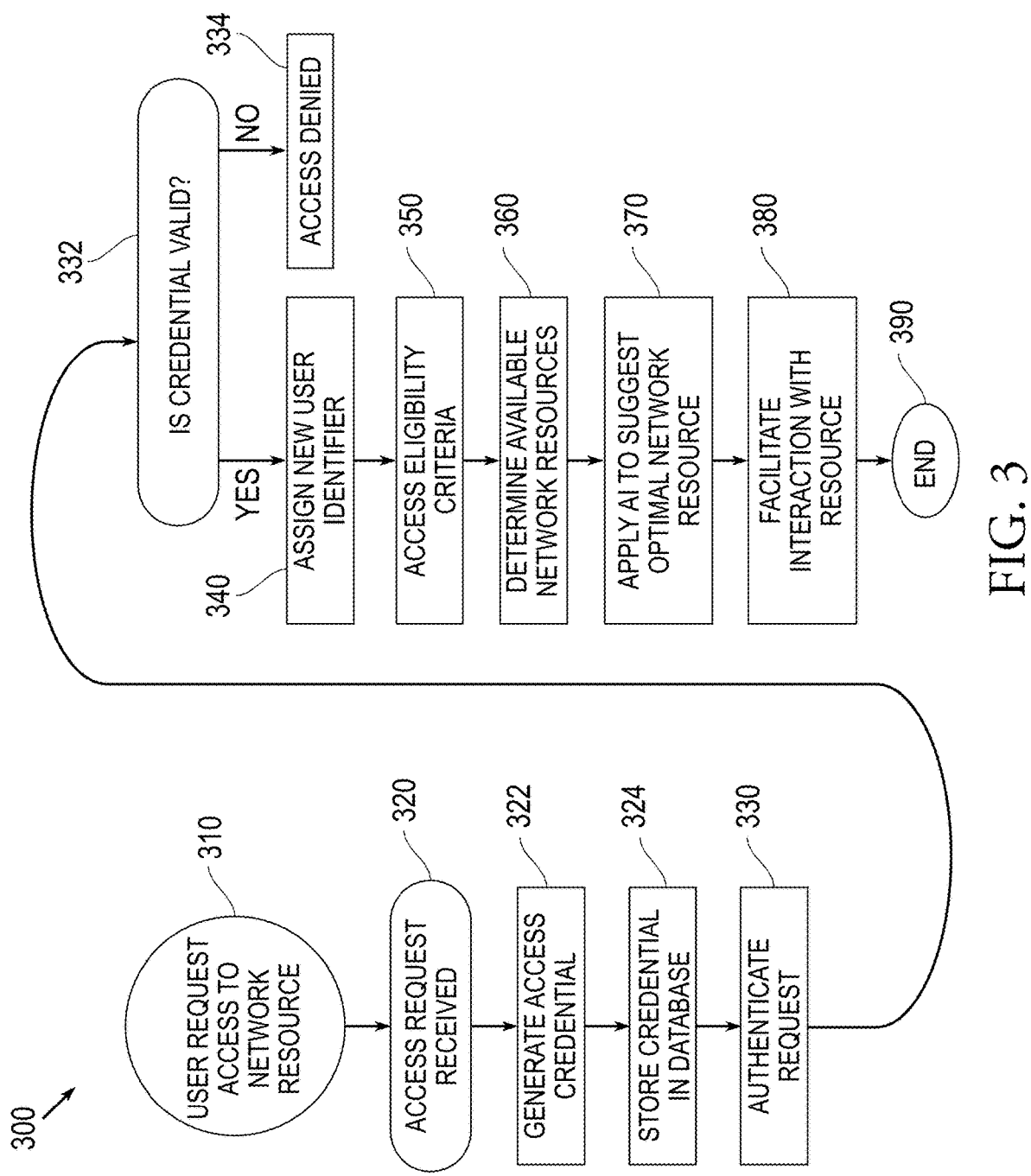
FIG. 3 is a flow chart illustrating steps in a high-level process flow associated with an example implementation of the present disclosure.

FIG. 3 is a flow chart illustrating example steps 300 in a high-level process flow associated with an example implementation of the present disclosure. In some implementations, a computer-implemented method for matching in real-time across multiple network resources for a new user is executed. In one or more implementations, the method comprises the step of receiving 320, by at least one computing device, which can be the same as or similar to computing device 230 shown and described in connection with FIG. 2. The computing device can be configured with processor-executed programming instructions to receive, from at least one other computing device operated by a user, a request 310 for access to a network resource. In particular arrangements, the method also can comprise the step of generating 322, by the at least one computing device, a credential authorizing access to the network resource for the new user, wherein the network resource (or plurality of network resources) is similar to the plurality of network resources 282 shown in FIG. 2. In various arrangements, the method also comprises the step of storing 324, by the at least one computing device, the credential authorizing access in an authentication database configured to store information about users which is similar to the authentication database 232 in FIG. 2.

In one or more variants, the method 300 can comprise the step of authenticating 330, by the at least one computing device, the request. In some implementations, this authenticating step 330 involves comparing the credential with information stored in the authentication database configured to store information about users. The method can additionally comprise the step of assigning 340, by the at least one computing device, a new user identifier for the new user, and wherein such user identifiers are stored in a user identifier database similar to user identifier database 242 depicted in FIG. 2. The method 300 can additionally comprise the step of accessing 350, by the at least one computing device, eligibility criteria stored in an eligibility criteria database (similar to the eligibility criteria database 252) that define user access to respective network resources.

In one or more arrangements, the method 300 can additionally comprises the step of determining 360, by the at least one computing device processing the eligibility criteria, a plurality of network resources (similar to outputs 292 depicted in FIG. 2) available for the newly assigned user identifier. In various arrangements, the method additionally comprises the step of applying 370, by the at least one computing device, artificial intelligence (similar to AI model 270 depicted in FIG. 2) to suggest and aid in selecting one of the plurality of network resources available for the newly assigned user identifier. In one or more implementations, the method additionally comprises the step of facilitating 380, by the at least one computing device, interaction between the new user and the selected one of the plurality of network resources. In various implementations, this is the last step 390 in a method consistent with the present disclosure.

Figure 4:
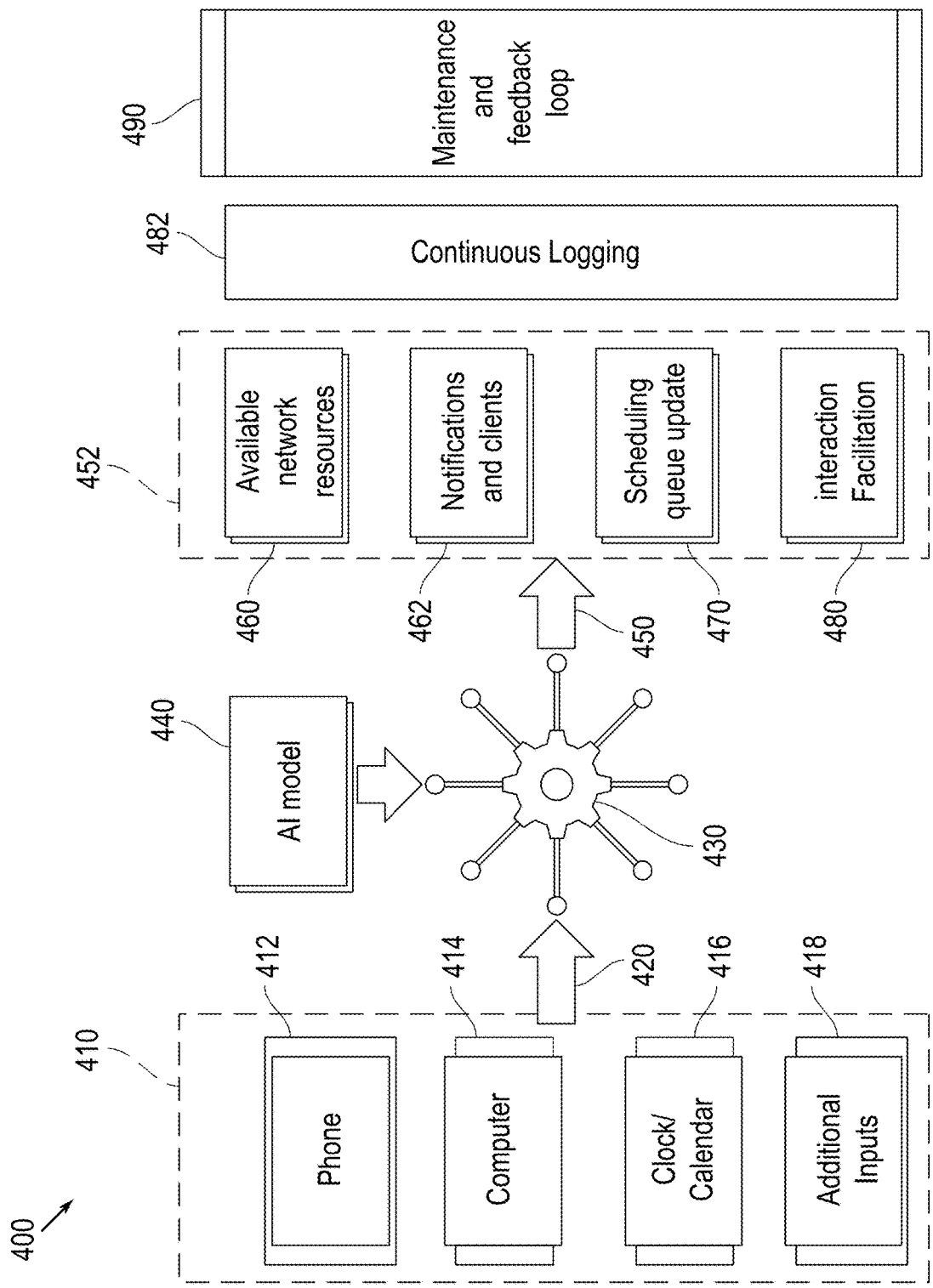
FIG. 4 is a diagram depicting inputs to and outputs from a network resource selection module, in accordance with an example implementation of the present disclosure.

FIG. 4 is a simplified web diagram 400 depicting inputs 420 to and outputs 450 from a network resource suggestion and selection module 430, which can be the same as or similar to the computer device 230 shown in FIG. 2. Input request sources 410 transmit (via data transmission path 420) a request for access to a network resource 460. This request can be received and processed by a network resource suggestion and selection module 430. The input request sources 410 can comprise, but not limited to, a phone 412, a computer 414, a scheduling queue 416, and other additional inputs 418 (for example an API).

Continuing with reference to FIG. 4, an AI model 440 is in communication with the network resource suggestion and selection module 430. The AI model 440 operates dynamically, engaging in a flow of information with the network resource suggestion and selection module 430, thereby facilitating an enhanced decision-making, suggestion, and network resource selection process. This communication can allow for substantially real-time adjustments, where the AI model 440 can receive data related to current network conditions as well as contextual parameters from module 430. The model 440 can subsequently relay resource selections back to the module 430. Such an arrangement promotes efficient utilization of network resources by leveraging the predictive capabilities of the AI model 440 while improving flexibility.

Once the network resource suggestion and selection module 430, working in conjunction with the AI model 440, has made a selection about an appropriate network resource 460 to match with an input request, an output transmission 450 can select and connect the input request source with the selected network resource 460. In one or more implementations of the present disclosure, output transmission 452 can transmit information and instructions to one or more output sources 452, which can comprise but are not limited to the any of the following: available network resources 460, a notification and alert service 462, a scheduling queue update service 470, an interaction facilitation service 480, and other possible output sources.

Against this backdrop, a continuous logging function 482 can record transmissions and transactions throughout steps of the network resource request, suggestion, selection, matching, and facilitation processes. In one or more variations, information and data logged through the continuous logging function 482 is provided to a maintenance and feedback loop service 490, wherein any failed transmissions or requests can be serviced and wherein data transmission patterns can be analyzed and continuously improved upon through a feedback loop function. In some implementations, the feedback loop function is in electronic communication with the AI model 440 to make real-time adjustments to process flows based on a constant stream of data transmission feedback.

Figure 5:
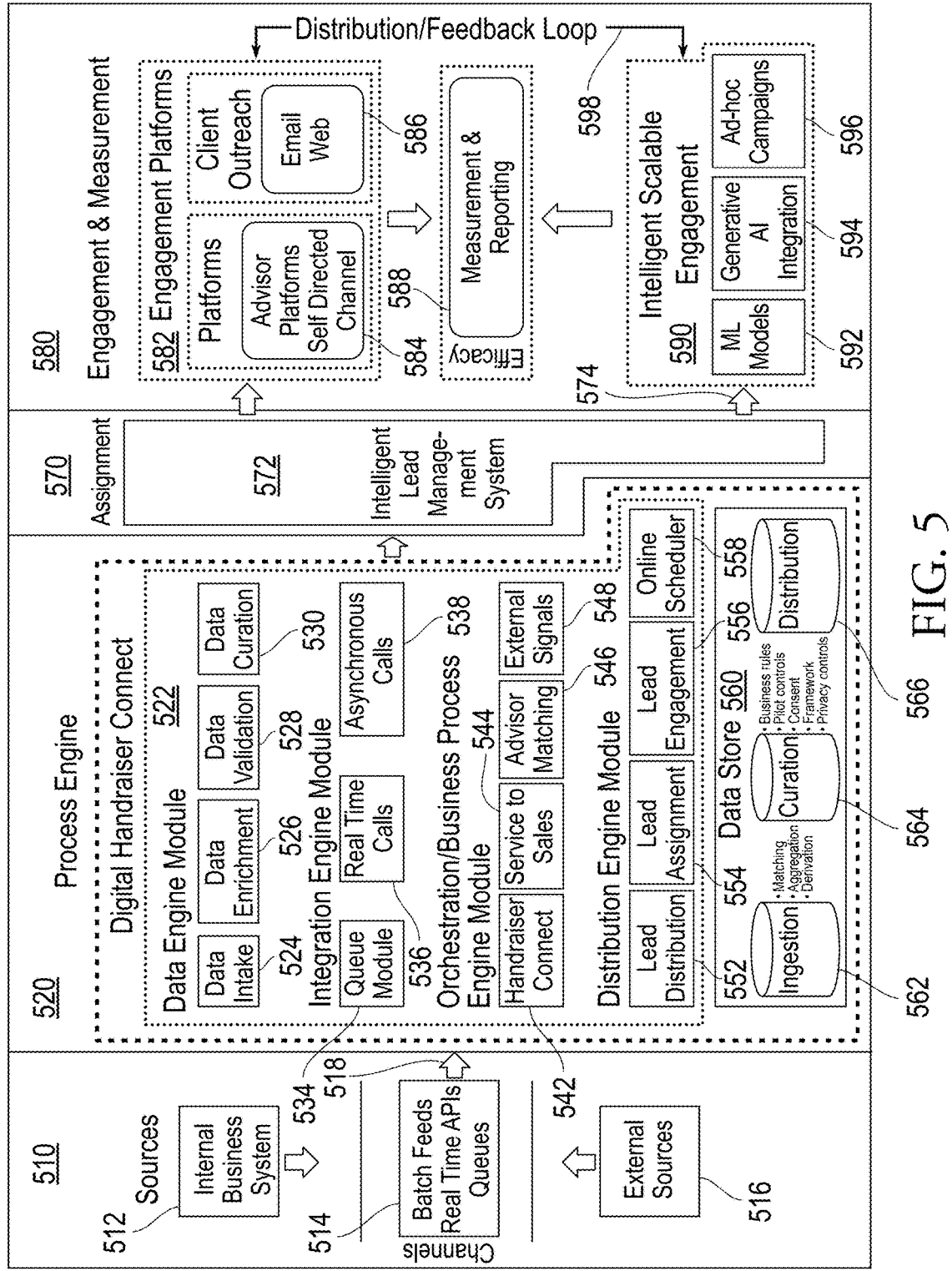
FIG. 5 is a diagram showing a flow of an example implementation of the present disclosure.

FIG. 5 is a diagram showing an exemplary implementation 500 of the present disclosure. In some implementations, several sources 510 can be aggregated and provided to a process engine 520 for assignment 570 to advisors (also referred to interchangeably as "FAs" in the figures and throughout this disclosure). In various implementations, post-assignment processes involving engagement and measurement 580 are performed to ensure continuous lead assignment process improvement.

In one or more implementations and with respect to the sources 510, several internal and external sources can serve as lead generation starting points for matching with and assignment to advisors. These sources can include but are not limited to internal business systems 512 and external sources 516 (such as calls and emails). Further, lead generation sources can then transmit to batch feeds comprising real time APIs and queues 514 for lead processing. The leads can then be transmitted to a process engine 520 for processing and subsequent assignment.

Continuing with reference to FIG. 5, a process engine 520 comprises several sub-modules. These sub-modules can include but are not limited to the following: a data engine module 522, an integration engine module 532, an orchestration and business process engine module 540, a distribution engine module 550, and a data storage module 560. In most implementations, these sub-modules are in electronic communication with each other to process a lead (such as a customer lead) efficiently. Data engine module 522 can comprise a data intake function 524, a data enrichment function 526, a data validation function 528, and a data curation function 530. Further, integration engine module 532 can comprise a queue module 534, a service for processing real-time calls 536, and a service for processing asynchronous calls 538.

With respect to the orchestration and business process engine module 540, in some implementations this module comprises a lead assignment connection service 542 (sometimes referred to as a "digital handraiser connect" or "DHC" service within this disclosure or in the figures). In various implementations, the orchestration and business process engine module 540 further comprises a service to sales function 544, and advisor matching service 546, and external signal transmissions 548. The distribution engine module 550, in some implementations, can comprise a lead distribution function 552, a lead assignment function 554, a lead engagement function 556, and an online scheduler 558. Data storage module 560 can include functions for data ingestion 562, data curation 564, and data distribution 566. In some variations, data ingestion 562 can include matching leads, aggregating leads, and derivation of leads. Important information is derived from leads to provide data for further downstream consideration and decision making in some systems and methods consistent with the present disclosure. In some variations, data curation 564 involves processing business rules, incorporating and processing pilot controls, incorporating and adhering to a predefined consent framework, and implementing privacy control.

In some implementations, after leads have been processed, leads are assigned to an advisor. This assignment function 570 can be enabled by an intelligent lead management system 572 working within or alongside the process engine 520. After a lead has been assigned to an advisor, in some implementations, data is transmitted (see arrows 574) to engagement and measurement modules 580. In some implementations, these engagement and measurement modules 580 comprise engagement platforms 582, intelligent scalable engagement tools 590, and measurement and reporting functions 588. In some variations, the engagement platforms 582 comprise advisor platforms with self-directed transmission paths 584 and client outreach sources such as email or website interfaces 586.

In one or more implementations, the intelligent scalable engagement module 590 comprises utilization of machine learning models 592, generative AI integration 594, and ad-hoc campaigns 596. In one or more implementations, the tools within the intelligent scalable engagement module 590 have access to and support one, some, or every stage of the lead management and assignment process depicted in FIG. 5. Additionally, in some implementations, a distribution feedback loop 598 enables continuous processing of feedback, data logging, lead matching, lead assignment, and data transmissions. Each of these engagement and measurement modules, along with the feedback loop 598, work together, in most implementations, to ensure continuous improvement of the intelligent lead management and assignment process, consistent with the present disclosure.

In one or more implementations, systems and methods consistent with the present disclosure serve as a real-time customer engagement engine that enables applications to source leads from various sources (such as sources 510) and assign them to the most suitable advisors (such as via assignment function 570). In particular arrangements, systems and methods consistent with the present disclosure function as cross-functional programs that consolidate various client advisor request (i.e., "handraiser") experiences into a single centralized framework. Such a framework enhances efficiency and reduces computing time by connecting discrete sets of processes across multiple businesses. In some implementations, systems and methods consistent with the present disclosure standardize the language and contracts between process and system boundaries.

In one or more implementations, a lead assignment connection service leverages an event-driven microservice architecture, underpinned by robust technologies such as JAVA SPRING BOOT, CAMEL Framework, and KAFKA MESSAGING PIPELINE, and can be deployed in a cloud-like environment. In various arrangements, systems and methods consistent with the present disclosure effectively address several critical aspects of modern customer services and customer engagement. In one or more variations, systems and methods consistent with the present disclosure provide a centralized data capture "plug-and-play" model for expanding to new sources (such as sources 510) and incorporates a two-way feedback loop (such as feedback loop 598) for intelligent client engagement. In some implementations, the framework depicted in FIG. 5 and others is designed for any application that interacts with or has access to prospects and leads, seeking to streamline the intake and assignment process within a centralized system.

In particular arrangements, systems and methods consistent with the present disclosure perform assignments in real time, significantly reducing customer engagement latency and ensuring more timely interactions, thereby decreasing missed opportunities and enhancing overall customer satisfaction. In one or more implementations, systems and methods consistent with the present disclosure also function as a standardized central framework that improves a lead capturing system's adaptability and reduces the time-to-market for new features.

As shown and described herein, computer-implemented systems and methods are provided, including those depicted in FIG. 5, which fit seamlessly into a streamlined lead engagement process. In one or more variants, the system goes beyond mere product assignment by strategically evaluating and suggesting suitable network resources. In various arrangements, this network resource evaluation and suggestion considers factors such as customer preferences (for example, with the data storage module 560), historical interaction data, and real-time insights. In one or more variations, systems and methods shown and described herein can improve engagement within a chosen network resource, including by matching customers with the advisor best suited to their needs (such as within distribution engine module 550). In one or more implementations, by seamlessly aligning product suggestions, network resources, and assignments, the engine enables a highly tailored and effective customer experience, fostering strong connections and driving overall success.

The systems and methods shown and described herein can integrate existing lead sources and network resources seamlessly and provide useful data for further downstream systems and processes, such as via engagement and measurement module 580. In various arrangements, the system utilizes intelligent systems and machine learning models (such as within intelligent scalable engagement module 590), allowing for a quick time-to-market to present opportunities to the FAs by notifying them in real time to engage further with the lead. Further, data can be collected in a process consistent with the present disclosure is also beneficial for reporting and measurement across an entire enterprise, while the centralized framework creates opportunities for advanced analytics that can further enhance (by training) the machine learning models.

Figure 6:
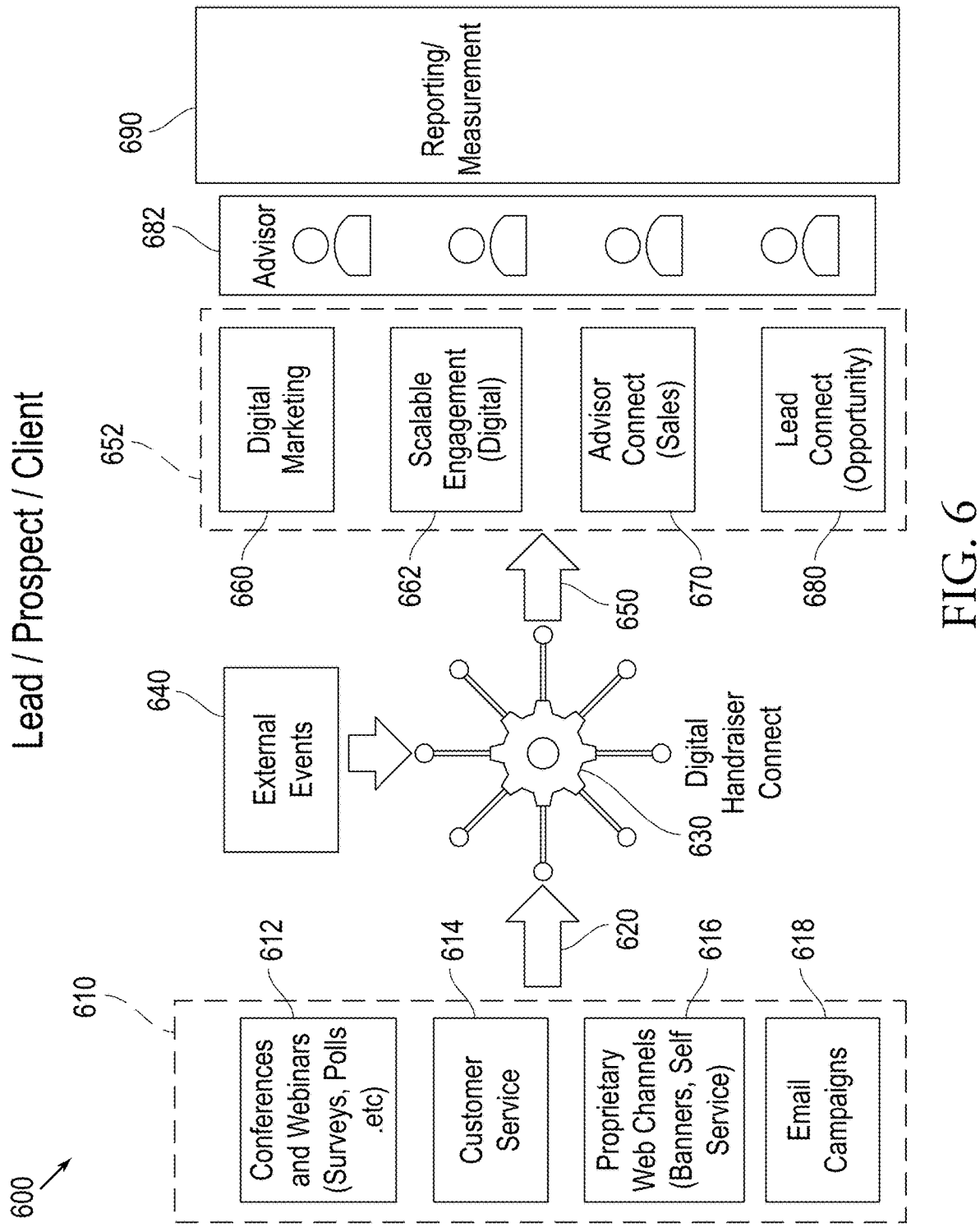
FIG. 6 depicts an implementation of the present disclosure, including inputs to and outputs from a network resource selection module.

FIG. 6 is an example web diagram 600 depicting an exemplary specific implementation of inputs to and outputs from a network resource selection module consistent with the present disclosure. In some implementations, lead sources 610 are provided (via arrow 620) to a lead management and assignment service 630 (also referred to herein as "digital handraiser connect" or "DHC"). In one or more implementations, the lead sources 610 can include but are not limited to conferences and webinars 612, customer service referrals 614, proprietary web sources (such as banner ads and self-service) 616, and email campaigns 618. The lead management and assignment service 630 can be configured to process leads according to a predefined technical framework (such as the one depicted in FIG. 2). In some implementations, the lead management and assignment service 630 also receives signals related to external events 640, which can be customer or user information sessions, informative webinars, or other suitable activity.

Once leads are processed, they can be transmitted (arrow 650) to output nodes 652. Such outputs can include but are not limited to digital marketing 660, scalable digital engagement 662, advisor connections 670, and lead connections (for various opportunities) 680. In multiple implementations, one or more advisors 682 are available to service connections 670, lead connections 680, or both. Furthermore, data from all prior inputs and outputs can be aggregated, transmitted to, and processed in a reporting and measurement stage 690.

Figure 7:
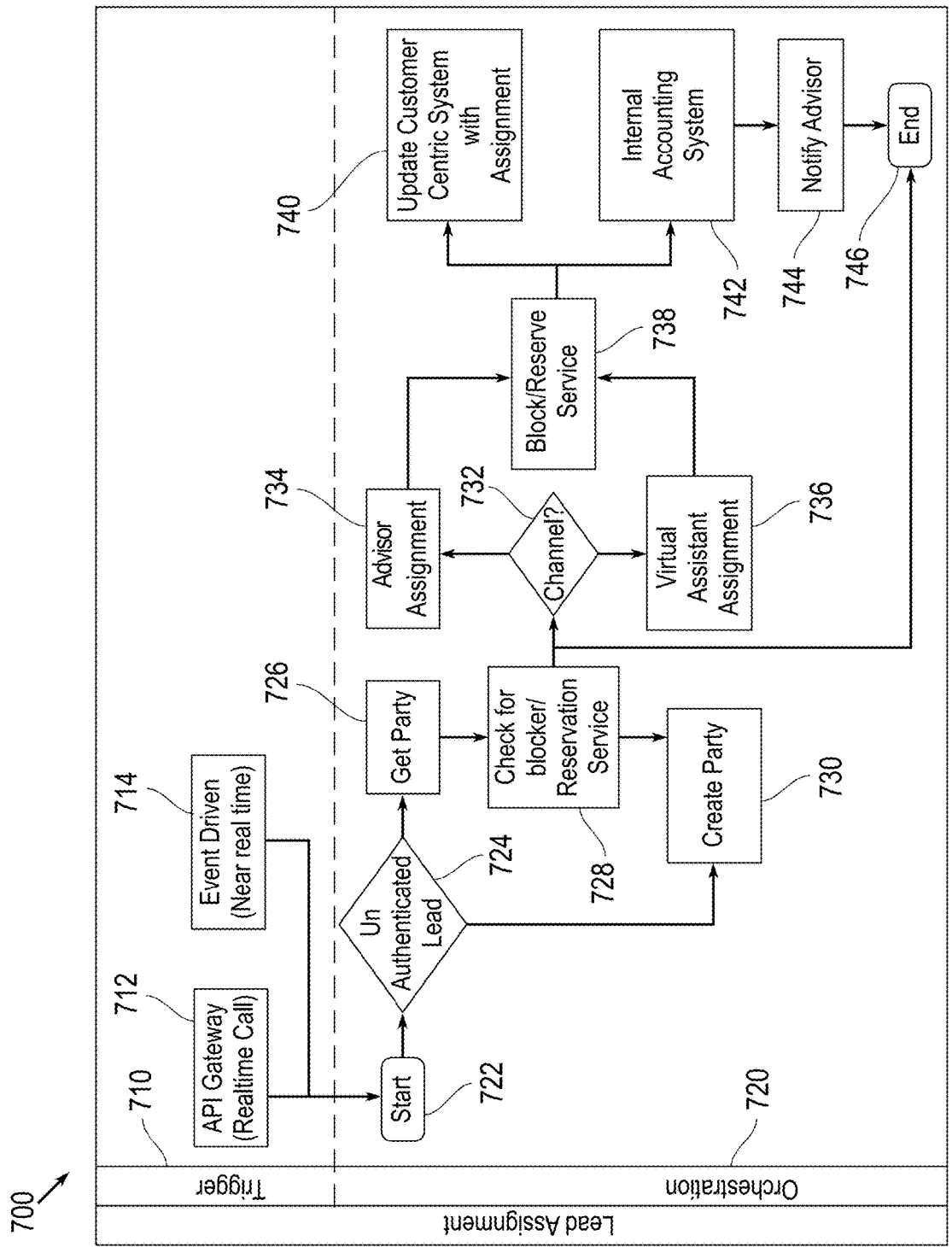
FIG. 7 is a flow diagram illustrating steps associated with an example implementation with the present disclosure.

FIG. 7 is a flow diagram depicting an exemplary process 700 in accordance with the present disclosure. In one or more implementations, systems and methods consistent with the present disclosure feature an exposed API 712 along with an event-driven architecture 714 that facilitates real-time event-driven flow triggers 710. In the example shown in FIG. 7, after a lead enters the flow at start node 722 for the lead assignment process 720, the lead is authenticated 724 to determine whether it is a lead that currently exists or that has not been encountered before. A Party ID serves as a unique identifier assigned to individual users or entities within the system, facilitating streamlined tracking and management of user interactions with network resources. If the lead is authenticated at node 724, a party ID is retrieved 726 from preexisting internal sources. If the lead is identified as non-existent (net new) at node 724, the "created party" ID flow 730 is triggered to generate a party ID within internal systems for the new lead.

Continuing with reference to FIG. 7, once a party ID is either retrieved or generated, a check can be performed at service node 728 for any blockers or reservations. This can include an evaluation involving different types of blocks based on several factors related to the party, such as the company where a party works. In situations where a block or reservation is present, the process flow may end at end node 746. In one or more variations, after checking for blocked parties, and if none is determined as an impediment, an assessment can occur, at node 732, whether the party is eligible for assignment to an advisor or a virtual assistant. Depending on the origin of the event, the assignment process varies: some parties are assigned to an advisor at node 734, while others are assigned to a virtual assistant at node 736. At this stage, a block and reservation service is implemented at node 738 (if a block or reservation for the party exists that did not previously end the assignment process).

In one or more implementations, once the advisor or virtual assistant is identified, systems and methods consistent with the present disclosure update internal systems at nodes 740, such as a production and data tracking system, with a new job position number (JPN). This ensures internal records are accurate. Subsequently, in some implementations, systems and methods consistent with the present disclosure update the marketing cloud instance 742 (such as an internal accounting system) with the assignment, which in turn notifies the FA at node 744 that the assignment has been made. In some variations, this ends the process at end node 746.

Figure 8:
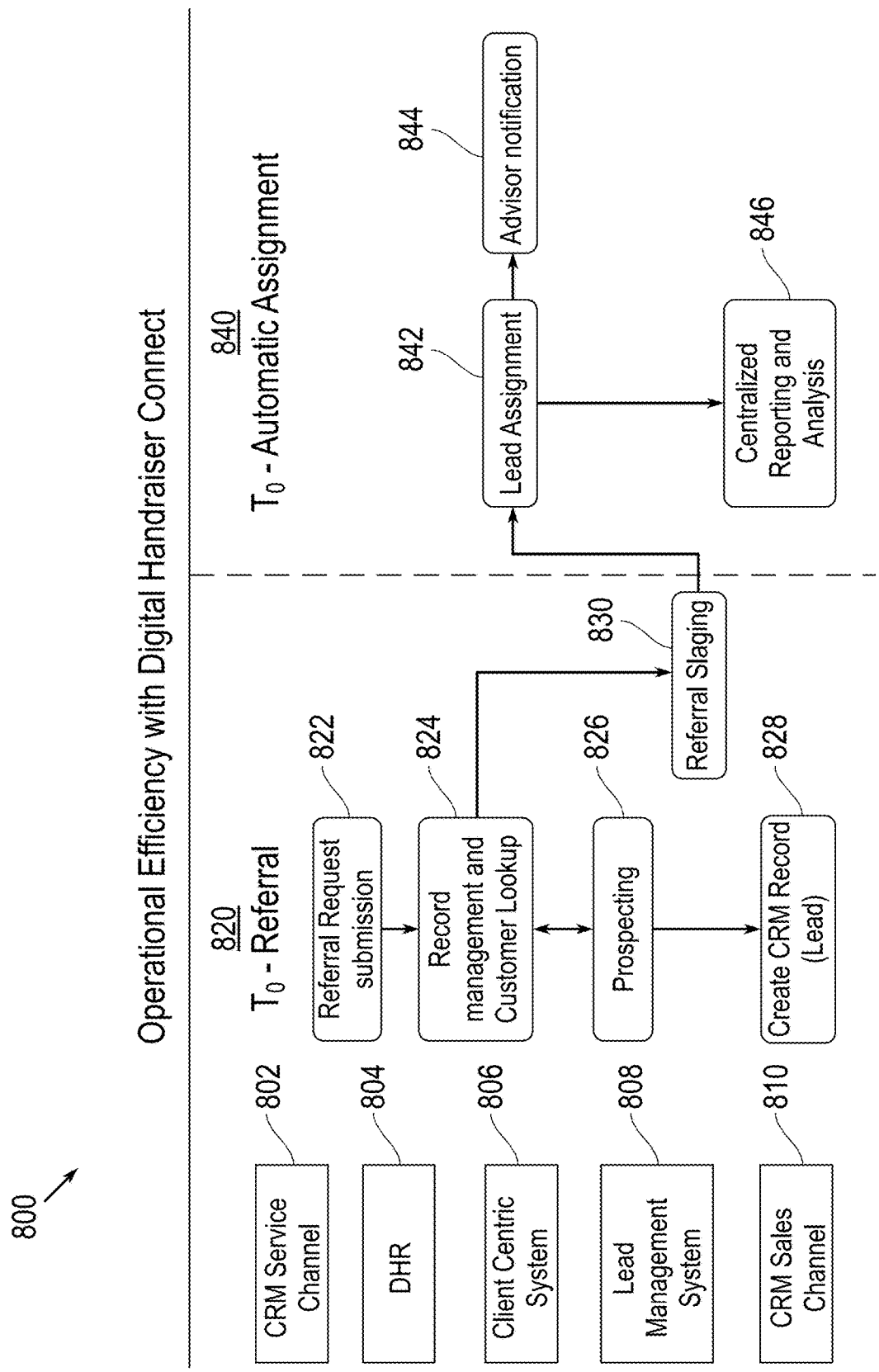
FIG. 8 is a process efficiency chart, in accordance with an example implementation of the present disclosure.

FIG. 8 is a process efficiency chart 800 consistent with an exemplary specific implementation of the present disclosure. For context, prior operational challenges to lead matching and assignment hinder efficiency. In some implementations, prior delays resulted from files of lead assignment requests being received as nightly batches, either through feeds or as individual files. In particular arrangements, on the day of ingestion (at a time T0), data was normalized and ingested into a data lake layer from these files. In one or more variations, these data points would only become available the following day (at a time T1) for processing via daily delta. In various arrangements, these records were consumed and processed according to predefined rules, resulting in an extract that is then sent back to the data lake for further consumption.

Continuing with a description of prior operational challenges, in one or more implementations, once the records were available in applications the next day (at a time T2), the records would ideally be picked up (or acted upon) on the same day. In one or more variants, this would allow someone to manually assign the lead to an advisor, ensuring that the advisors are notified of this assignment. In some implementations, the assignment records then would become available in the advisor platforms for review on the following day (at a time T3). In one or more arrangements, the best-case scenario results in availability by T0+3, which introduces significant latency in consumer engagement.

FIG. 8 depicts the vertical process efficiencies achieved by performing many of the actions detailed above in parallel instead of consecutively, according to one or more implementations of systems and methods consistent with the present disclosure. In some implementations, the following systems work in tandem: a customer relationship management (CRM) service 802, a lead suggestion service (or DHC) 804, a client centric system 806, a lead management system 808, and a CRM sales service 810.

In some implementations, and as depicted in FIG. 8, during the referral stage 820, at a time T0, a referral request is submitted (at 822). In some variations, the referral request submission 822 is acted upon instantaneously and passed to a record management and customer lookup function 824. In some implementations, this logged and processed data is then transmitted to a prospecting stage 828 and further transmitted to finalizing referral staging 830. Additionally, in some variations, and still within the referral stage 820, a CRM record is created for the lead (at 828). In some implementations, all of this happens within the same day or time period T0.

Restated, upon implementation of a system or method consistent with the present disclosure, and as depicted in FIG. 8, in some implementations, events are now received as API requests or through event queues instead of nightly batches, which reduces latency and enables real-time operations. In one or more implementations, once a request is received at 822 and identified internally at 824, the system identifies the appropriate course of action for the requested individual via the prospecting service 828.

In particular arrangements, after gathering necessary information on the lead ad 824, the referral is staged in a lead management system 808 and subsequently processed for lead assignment 842 in real time on the same day. In some implementations, this occurs via automatic assignment 840. In various arrangements, systems and methods consistent with the present disclosure also notify (at 844) the appropriate advisor and adds the record (at 846) to all internal cloud account management instances for advisor platforms, ensuring the request and lead are both included in centralized reporting and analysis. This demonstrates how processes consistent with the present disclosure are now automated, allowing for rapid engagement with an advisor, which leads to a positive customer experience. In one or more variations, the new flow eliminates unnecessary human intervention and significantly enhances processing time.

Figure 9:
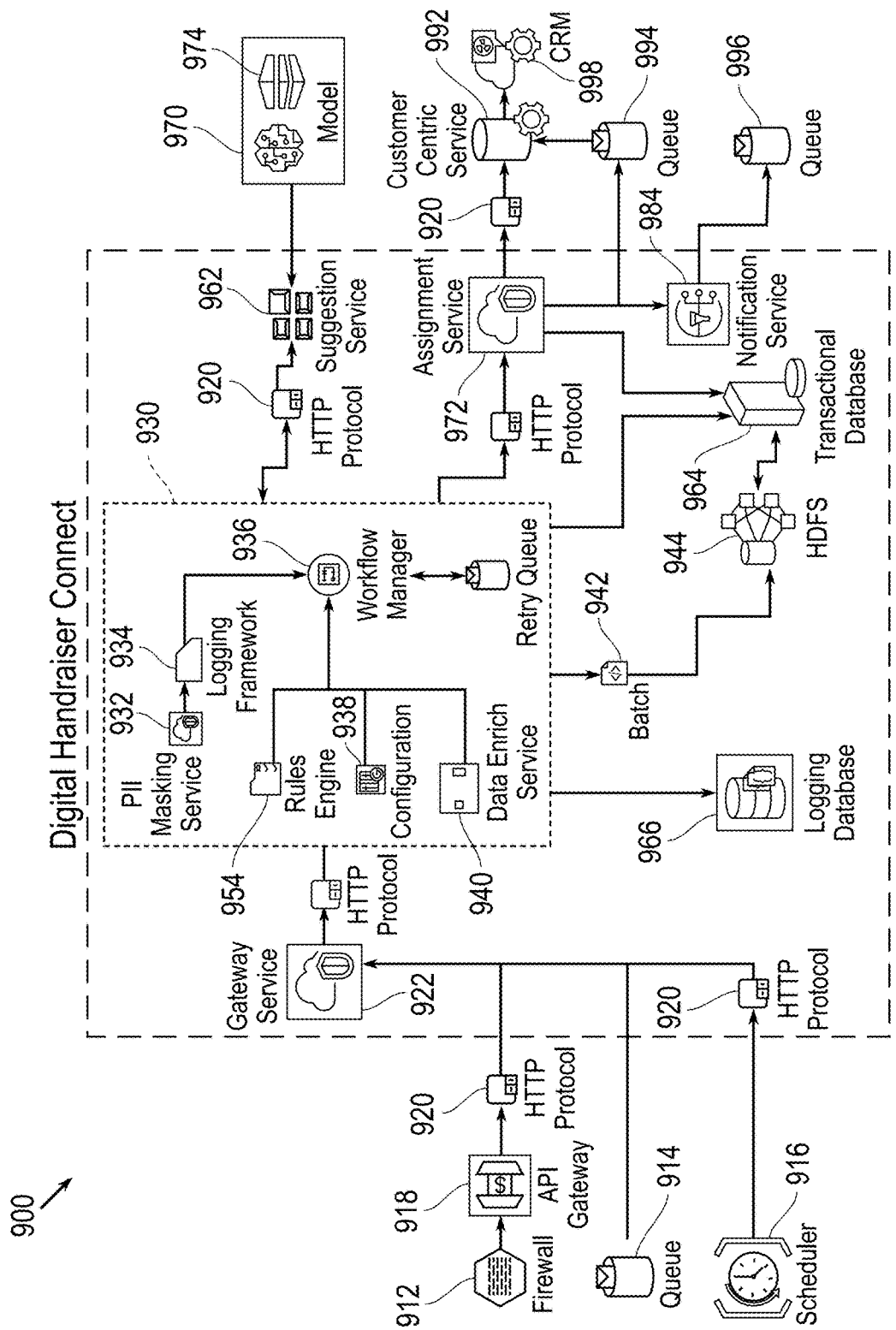
FIG. 9 is a technical diagram, in accordance with an example implementation of the present disclosure.

FIG. 9 is a technical diagram 900 consistent with an exemplary specific implementation of the present disclosure. FIG. 9 depicts the DHC framework according to one or more implementations along with its components. In one or more implementations, the framework consists of several services organized within a microservice architecture that facilitates cross-functional rule-based interactions. In particular arrangements, the gateway service 922 serves as the landing point for all incoming requests. In some implementations, these requests can take the form of three or more types, which include at least the following and in no particular order. First, external API calls are processed by an HTTP protocol 920 that are received via the firewall 912 and API gateway 918. Second, event-triggered requests come through a queue 914. Third, overnight scheduled batches remain supported from any legacy systems and are received from a scheduler 916. With respect to queue 914, in some implementations queue 914 is a batch queue (similar to queue 218 in FIG. 2) for users or leads awaiting connection to network resources. This input type facilitates ASYNC bulk request processing capabilities that are pre-scheduled. Some implementations support bulk request processing in an asynchronous fashion from other systems (legacy, upstream, or external) via, for example, a KAFKA queuing service. Systems can send messages via PUB/SUB architecture to be processed in an asynchronous manner. Such bulk requests are then processed based on a comparison of, for example, data related to priority scheduling and resource availability.

FIG. 9, according to various arrangements, illustrates the technical structure involved in operation of systems and methods consistent with the present disclosure. In some implementations, the scheduler 916 receives data from customers, and the firewall node 912, for example, also retrieves information simultaneously. In particular arrangements, leads flow through multiple data transmission paths, including the firewall 912 from a website, and external sources hitting the API from outside, ultimately reaching the queue 914, scheduler 916, and other nodes.

In this context and in one or more implementations, an HTTP protocol 920 is utilized to enable secure and efficient communication for external API calls or other modes of data transmission throughout the technical diagram, allowing seamless integration and interaction between different services within the DHC framework. In one or more variants, the gateway service 922 then forwards the request to other services through appropriately tagged data transmission paths to maintain the original source of the request. In particular arrangements, the orchestration service 930 incorporates a rules engine 954 responsible for determining the next processing steps based on various factors. In various arrangements, when the rules engine 954 is employed, it is programmed to handle storing rules for each input and network resource and methods for operating communication modes. In particular arrangements, predefined business rules dictate how to connect with specific types of leads.

In one or more implementations, the orchestration service 930 also handles all personally identifiable information data masking 932 obligations to protect sensitive client data. In one or more variations, the orchestration service 930 extensively logs all incoming and outgoing requests in a logging framework 934, facilitating the tracking of any prospect's path and aiding in debugging efforts. In some implementations, a logging framework 934 is deployed, maintaining records of access modes, such as laptop, iPad, phone, or call. In one or more implementations, different settings are stored for various types of data sourced from different lead sources. In particular arrangements, frameworks from diverse sources are leveraged for enhanced functionality. In some implementations, the orchestration service 930 transmits all incoming and outgoing requests to a logging database 966, making it easy to track the path of any prospect and for debugging purposes. In various implementations, the logging database 966 and a transactional database 964 are the same database. In other implementations, they are separate.

In various arrangements, the PII masking service 932 and a logging framework 934 also focus on preventing data leakage. In one or more variations, logs are restricted and utilize technical security solutions to safeguard information. In one or more implementations, outputs from each service within the technical diagram depicted in FIG. 9 can be directed to the AI model 974, the assignment service 972, or database storage such as transactional database 964. In particular arrangements, the output from the orchestration service 930 is designed to operate through continuous improvement derived from a feedback loop back into the orchestration service 930. In various implementations, the transactional database 964 logs the data flow, suggestions, assignments, operations on a lead, and its transmission path. In one or more variants, the flow from the orchestration service 930 to the transactional database 964 and from the assignment service 972 to the transactional database 964 represents what is predicted against what actually occurs, respectively.

In various arrangements, the workflow manager 936 connects the components within the orchestration service 930. In one or more implementations, the goal is to ensure that leads can interact with the internal connection network, regardless of their method of contact. In particular arrangements, this interaction includes acquiring information about leads, such as personally identifiable information (PII) processing by the PII masking service 932, engaging with the website (via, e.g., firewall 912), and laying the foundation for complex use cases. In some implementations, requests are sent to the appropriate personnel, leveraging access to assignment service 972 and suggestion service 962. In particular arrangements, a retry queue 956 is established to ensure all inputs are captured. In some implementations, since inputs may fail regularly, the retry queue 956 attempts multiple retries for durability and resiliency. In one or more implementations, if there is no method for processing a new type of lead, this retry queue 956 will alert an application support team to create new input source integration. The configuration symbol 938 represents configurations for all inputs, accounting for different scenarios. These include thresholds for various data points, hotline numbers, exclusion lists, recommendation models and other such common central configuration details that are required for DHC to process different input types from users. The data enrich service symbol 940 represents a tool that accesses internal systems and databases to retrieve information about a user, for example, using a user identifier. In some implementations, user interest needs, such as demographic information, account metadata, or other suitable information can be collected and used for suggesting or assigning a respective network resource. The data enrich service 940 can also serve to implement business use cases for network resource reservations and coverage checks.

In various arrangements, an assignment service 972 calls the customer-centric service 992 to provide necessary information for pairing a lead to an advisor and subsequently updates the customer-centric service 992. In some implementations, the assignment service 972 stores the pairing in a transactional database 964. In some implementations, information stored in the transactional database 964 is also utilized in future calls to the orchestration service 930 for validations and checks, establishing a bidirectional relationship. In various arrangements, a transactional database 964 emerges from the orchestration service box 930, with intermediary outputs directed towards an HDFS 944 architecture for assisting in storing files. The batch symbol 942 represents the transfer of non-immediate information to internal databases in batch. It can also include a distribution of data for use by downstream systems, through such batches. This function addresses batch processing by facilitating immediate decision-making for proper network resource assignment and for connections thereto.

In particular arrangements, systems and methods consistent with the present disclosure notify an assigned advisor platform application of recent assignments, allowing the notification service 984 to further inform the advisor and display the assignment. In one or more variants, this notification service 984 inherits rules from upstream processes to determine whether to store data in real time or via a queue 994, depending on the use case. In various implementations, the customer-centric service 992 is in direct electronic communication with a preexisting customer relationship management service 998. In one or more implementations, the assignment service 972 features two outputs: one directed to the notification service 984, and another directly linked to the customer-centric service 992. In various arrangements, while some leads require immediate assignment to an advisor, others may need to be queued for later assignment (via queue 994), allowing functionality through various outputs. In some implementations, all queues maintain internal processes dictating lead priority and queuing model rules. In particular arrangements, the notification service 984 provides internal notifications regarding assignment outcomes, alerting one or multiple applications associated with a lead to update files for tracking progress.

In various arrangements, the suggestion service 962 has access to internal machine learning-powered suggestion models 974 that are utilized to suggest the appropriate advisor for a given party. In one or more implementations, this suggestion process considers various factors, such as the distance from the advisor, languages spoken by the advisor, and the advisor's certifications or specialties. In one or more variations, these models 974 reside in an intelligent lead management system 970 and are tailored to specific applications and use cases. In one or more implementations, the notification service 984 or other services within the DHC framework record all events processed within technical implementations of the present disclosure, including the following: party updates, party reassignments, and lead conversions.

In particular arrangements, the suggestion service 962 is equipped with access to ML and AI models (970 or 974 within 970), employing rules to suggest assignment of specific types of leads to particular advisors. In one or more variations, some leads require random advisors for assignment, which the assignment service 972 is programmed to implement. In some implementations, the range of advisor suggestions can vary from one to any number of qualified advisors for a specific lead. In various arrangements, factors such as language preferences are considered, leveraging AI models such as model 974.

In one or more variants, API-to-API integration allows any input source or network resource to connect to this centralized connection system. In specific implementations, there exists an API file along with a queuing integration. In one or more variants, machine learning aspects are integrated into the system. Within one implementation, AI models like model 974 are trained on data flows from existing systems to enhance efficacy. In some implementations, JSON and contract language data will be compiled and provided to AI models, enabling the AI models to identify unique or high-interest leads and recommend assignment of them to advanced network resources (such as advisors) accordingly.

Figure 10:
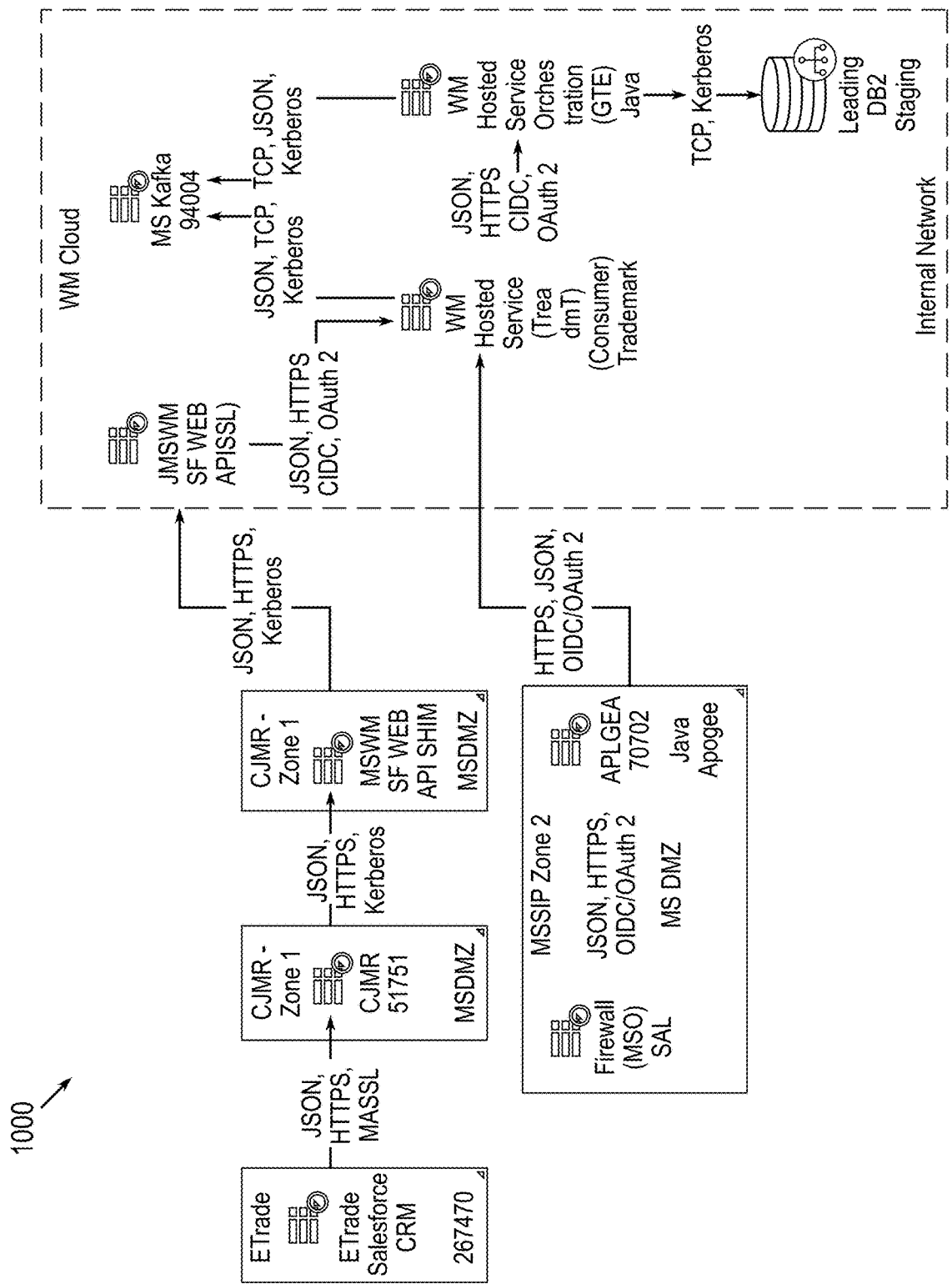
FIG. 10 is a diagram of as security architecture, in accordance with an example implementation of the present disclosure.

FIG. 10 is a diagram 1000 of security architecture consistent with an exemplary specific implementation of the present disclosure. The present disclosure supports security arrangements, such as the example security architecture shown in FIG. 10. Digital Handraiser APIs, such as those used in systems and methods consistent with the present disclosure are REST services, can be accessed using HTTPS URLs. In various arrangements, the most sensitive type of data handled is classified as Highly Restricted; this data is related to leads and does not include any user data. In one or more implementations, FINWELL serves as one of the consumers coming from an external network via APIGEE, while another consumer utilizes API access through external network connectivity using C2MR and SIM.

In particular arrangements, the following security requirements have been implemented. In one or more variants, server-side authorization is achieved using JWT Authorization. In some implementations, end-user authorization is handled through OIDC/OAuth2. In various arrangements, input validation is employed to enhance security. In one or more variations, data transfer encryption is implemented through the encryption of JSON in transit using TLS encryption. In one or more implementations, auditing and logging measures are established using SECURE SPLUNK and LAAS.

With respect to functional requirements, in one or more implementations, a technology asset inventory can maintain a list of all technology assets and the corresponding users who have entitlements to those assets. In various arrangements, technology users who require access to Production Logs for additional support must request the data reporting role in TAI for the application. In one or more variations, application support groups (ASG), which support technology teams across all applications, are authorized production-level individuals with access to Splunk logs, in addition to the SPLUNK EUT product support teams.

In one or more implementations, the system can additionally adhere to the following non-functional requirements. In particular arrangements, authentication via a SEC ARCH approved pattern and authorization via an ENTITLEMENT MANAGEMENT PLATFORM-EPR (Entitlement Provisioning & Reporting Tool) can be leveraged. In various arrangements, any LDAP groups used for authorization can be listed as ACL (Access Control List) and have a FWD group entitlement type, with prod managing the LDAP group.

In one or more variants, unit testing code coverage can adhere to various security standards, and a quality gates setup can be used to ensure compliance therewith. In one or more variations, the team can comply with the established review process for requirements, design, code development, release management, and ongoing support processes. In some implementations, WMDEVOPS best practices for SRE, tooling, and all development and operational aspects can be adhered to for compliance, risk management, and platform modernization. With strict code coverage standards implemented while developing new code, edge cases can be tested prior to being placed into live production. Comprehensive and diverse cross-function and cross-system integration testing provides for seamless integration with downstream and upstream systems.

In various arrangements, WMDEVOPS can adopt dependency freshness, security vulnerability (CVE) metrics, and other newer metrics via the TECH MODERNIZATION initiative. In one or more implementations, the ASG team can be onboarded to support end-to-end monitoring in a production environment. In particular arrangements, SPLUNK logs can be leveraged for error logging, and additional dashboards can be set up along with monitoring tools like CHECKNANNY, APP DYNAMICS, JETSON, and others.

In various arrangements, extensive adaptability can be provided through generic coding and a no-code/low-code ideology, allowing for scalable lead source integration in the future. In one or more implementations, advanced observability with standardized message formats can support proactive monitoring and rapid incident resolution. Further, current information from internal systems can be accessed to aid in providing well-informed assignments. In particular arrangements, it can provide an event-driven real-time solution to assign or create a lead with the appropriate advisor, ensuring same-day engagement possibilities.

It is to be understood that disclosure above related to any individual FIG. 1-10 is, in various implementations, integrable with disclosure related to any other, or any combination of other figures. Furthermore, it is to be understood that like or similar numerals in the drawings represent like or similar elements through the several figures, and that not all components or steps described and illustrated with reference to the figures are required for all embodiments or arrangements.

Figure 11:
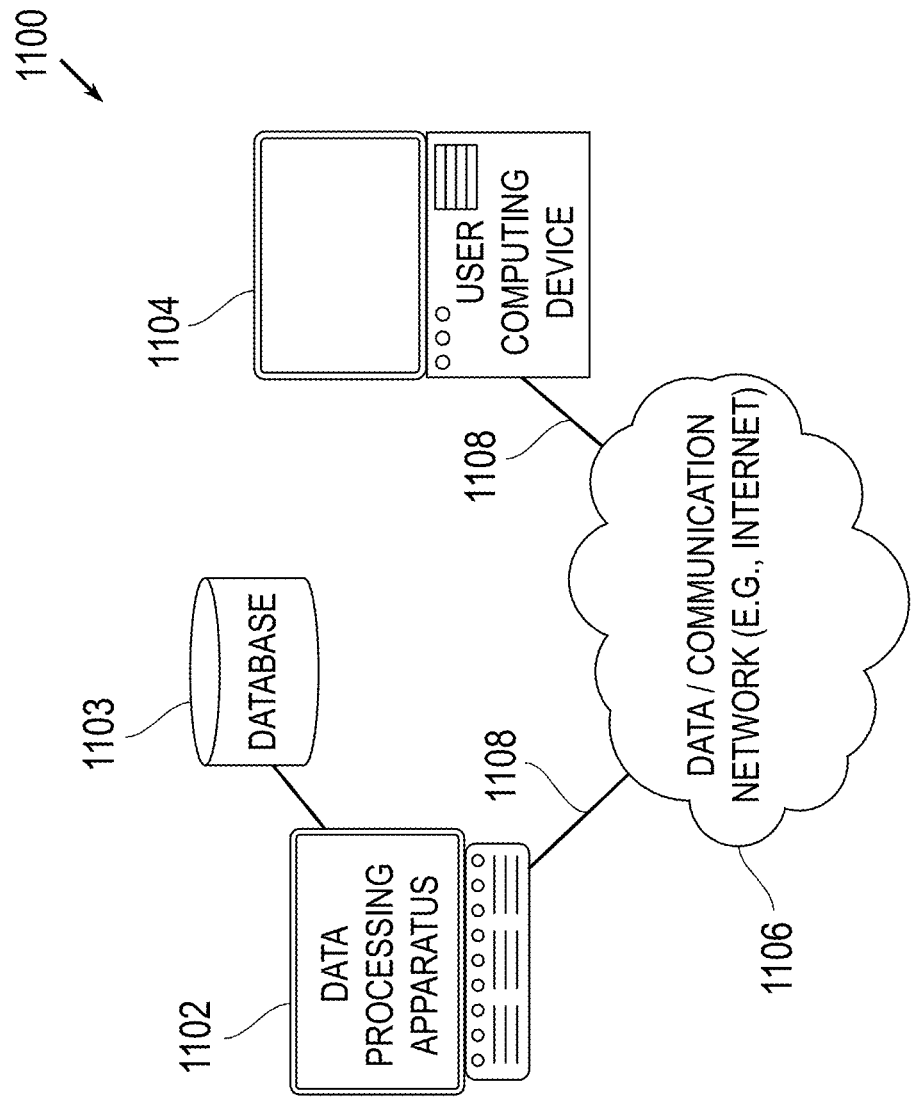
FIG. 11 is a diagram that shows an example hardware arrangement that is configured for providing the systems and methods disclosed herein.

Referring to FIG. 11, a diagram is provided that shows an example hardware arrangement that is configured for providing the systems and methods disclosed herein and designated generally as system 1100. System 1100 can include one or more information processors 1102 that are at least communicatively coupled to one or more user computing devices 1104 across communication network 1106. Information processors 1102 and user computing devices 1104 can include, for example, mobile computing devices such as tablet computing devices, smartphones, personal digital assistants or the like, as well as laptop computers and/or desktop computers, server computers and mainframe computers. Further, one computing device may be configured as an information processor 1102 and a user computing device 1104, depending upon operations being executed at a particular time.

With continued reference to FIG. 11, information processor 1102 can be configured to access one or more databases 1103 for the present disclosure, including source code repositories and other information. However, it is contemplated that information processor 1102 can access any required databases via communication network 1106 or any other communication network to which information processor 1102 has access. Information processor 1102 can communicate with devices comprising databases using any known communication method, including a direct serial, parallel, universal serial bus ("USB") interface, or via a local or wide area network.

User computing devices 1104 can communicate with information processors 1102 using data connections 1108, which are respectively coupled to communication network 1106. Communication network 1106 can be any data communication network. Data connections 1108 can be any known arrangement for accessing communication network 1106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1104 preferably have the ability to send and receive data across communication network 1106, and are equipped with web browsers, software disclosures, or other means, to provide received data on display devices incorporated therewith. By way of example, user computing device 1104 may be personal computers such as Intel Pentium-class and Intel Core-class computers or Apple Macintosh computers, tablets, smartphones, but are not limited to such computers. In addition, the hardware arrangement of the present invention is not limited to devices that are physically wired to communication network 1106, and that wireless communication can be provided between wireless devices and information processors 1102.

System 1100 preferably includes software that provides functionality described in greater detail herein, and preferably resides on one or more information processors 1102 and/or user computing devices 1104. One of the functions performed by information processor 1102 is that of operating as a web server and/or a web site host. Information processors 1102 typically communicate with communication network 1106 across a permanent i.e., un-switched data connection 1108. Permanent connectivity ensures that access to information processors 1102 is always available.

Figure 12:
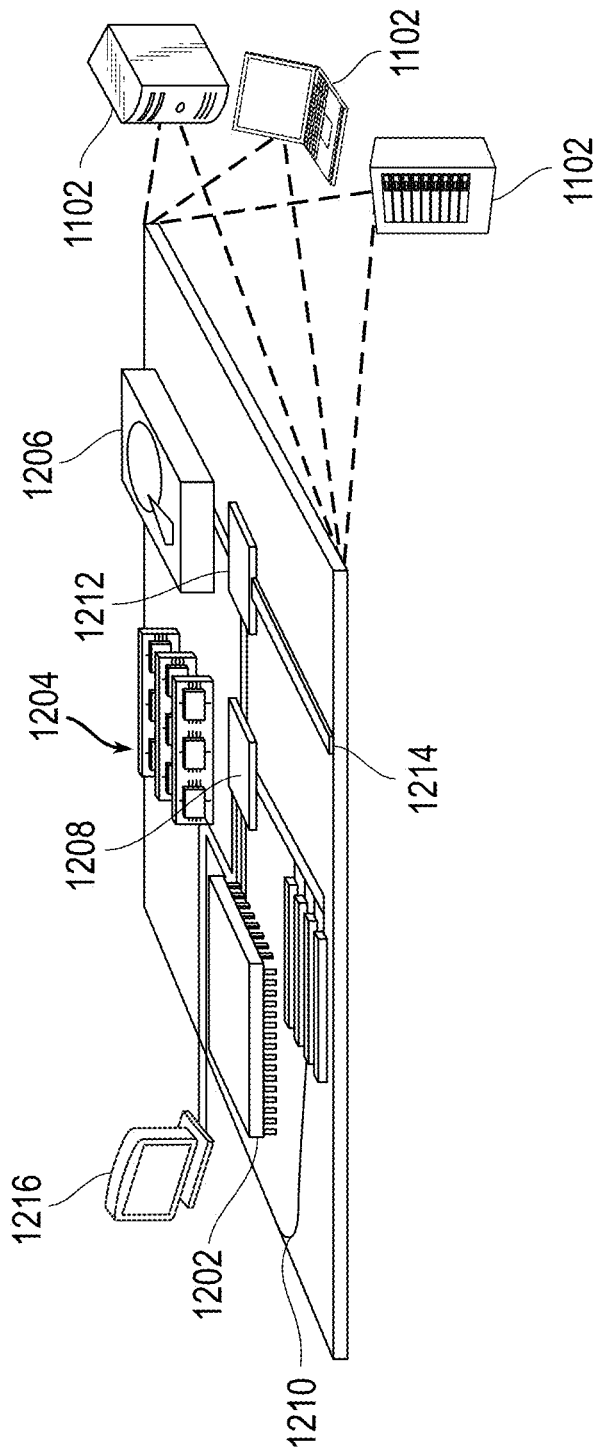
FIG. 12 shows an example information processor and/or user computing device that can be used to implement the techniques described herein.

FIG. 12 shows an example information processor 1102 and/or user computing device 1104 that can be used to implement the techniques described herein. The information processor 1102 and/or user computing device 1104 is intended to represent various forms of digital computers, such as laptops, desktops, workstations, personal digital assistants, servers, blade servers, mainframes, and other appropriate computers. The components shown in FIG. 12, including connections and relationships, and their functions, are meant to be exemplary only, and are not meant to limit implementations of the inventions described and/or claimed in this document.

As shown in FIG. 12, the information processor 1102 and/or user computing device 1104 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the information processor 1102 and/or user computing device 1104, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the information processor 1102 and/or user computing device 1104. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the information processor 1102 and/or user computing device 1104. In some implementations, the storage device 1206 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 can be configured to manage bandwidth-intensive operations, while the low-speed interface 1212 can be configured to manage lower bandwidth-intensive operations. Of course, one of ordinary skill in the art will recognize that such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In an implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and not be regarded as limiting. While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed:

1. A computer-implemented method for matching in real-time across at least one network resource, the method comprising:
    receiving, by at least one computing device configured with processor-executed programming instructions from at least one other computing device operated by a user, a request for access to a network resource, wherein the request comprises a credential authorizing the access to the network resource;
    authenticating, by the at least one computing device, the request by comparing the credential with information stored in a database;
    accessing, by the at least one computing device, a user identifier that has been assigned for the user;
    accessing, by the at least one computing device, eligibility criteria stored in a database and associated with each of a plurality of assigned user identifiers,
        wherein the eligibility criteria define user access to respective network resources;
    determining, by the at least one computing device processing the eligibility criteria, a plurality of network resources defined for the assigned user identifier;
    selecting, by the at least one computing device, one of the plurality of network resources defined for the assigned user identifier; and
    facilitating, by the at least one computing device, interaction between the user and the selected one of the plurality of network resources via a delay queue that is configured to facilitate immediate and delayed interaction;

determining, by the at least one computing device processing user priority rules, whether to facilitate immediate or delayed interaction;

where the result of the determining is to facilitate delayed interaction:

delaying, by the at least one computing device, the interaction for a customizable amount of time based on the user priority rules; and where the result of the determining is to facilitate immediate interaction:

facilitating, by the at least one computing device, immediate interaction between the user and the selected one of the plurality of network resources.

2. The method of claim 1, wherein facilitating the interaction further comprises:

implementing, by the at least one computing device, via a rules engine, rules for processing the request; and matching the user with at least one of a product, an advisor, and a data transmission output.

3. The method of claim 1, further comprising maintaining, by the at least one computing device, a retry queue that captures a failed request and resends the request in accordance with the user priority rules.

4. The method of claim 1, further comprising logging, by the at least one computing device, all interaction data in a transaction logging database, wherein the logged data comprises user identifiers, details of processed requests, details of network resource selections made, the eligibility criteria utilized, and the timestamps of each operation for future reference and auditing.

5. The method of claim 2, wherein the rules engine includes contextual parameters usable for identifying products, identifying network resources, identifying advisors, user engagement, and making assignments.

6. The method of claim 1, further comprising implementing, by the at least one computing device, a continuous improvement feedback loop with artificial intelligence capabilities, wherein feedback regarding performance of the network resources is collected and utilized to update the eligibility criteria stored in the database.

7. The method of claim 1, further comprising sending, by the at least one computing device, alerts to relevant applications when specific events occur, wherein the notifications are based on the actions taken on the requests, such as successful selections and interactions facilitated or failures in processing.

8. The method of claim 1, further comprising:

storing, by the at least one computing device, historical interaction data associated with the user identifiers to identify patterns; and using the historical interaction data to adapt rules to store data from upstream sources in real-time or via a queue.

9. The method of claim 1, further comprising outputting, via at least one data transmission output, the results of the network resource selection process to one or more of a notification service, logging database, or external API for further processing.

10. The method of claim 1, wherein the selected network resource is chosen based on defined criteria that comprise a consideration of historical success rates of past interactions through respective network resources employed for different user identifiers.

11. A computer-implemented system for matching in real-time across at least one network resource, the system comprising:

a computing device having a processor and configured by executing instructions stored on non-transitory processor readable media;

at least one other computing device operated by a user;

an authentication database configured to store user information;

an eligibility criteria database configured to store eligibility criteria defining user access to respective network resources; and a plurality of network resources, wherein the computing device is configured to receive, from the at least one other computing device, a request for access to a network resource, the request comprising a credential authorizing access to the network resource, wherein the computing device is further configured to authenticate the request by comparing the credential against the information stored in the authentication database;

wherein the computing device is further configured to access a user identifier assigned for the user, wherein the computing device is further configured to retrieve from the eligibility criteria database the eligibility criteria associated with the assigned user identifier, wherein the computing device is further configured to determine a selection of the plurality of network resources available for the assigned user identifier, wherein the computing device is further configured to select a network resource for the assigned user identifier, and wherein the computing device is further configured to facilitate interaction between the user and the selected network resource via a delay queue that is configured to facilitate immediate and delayed interaction;

wherein the computing device is further configured to determine, by processing user priority rules, whether to facilitate immediate or delayed interaction;

where the result is to facilitate delayed interaction:

the computing device delays the interaction between the user and the selected resource for a customizable amount of time based on the user priority rules; and where the result is to facilitate immediate interaction:

the computing device facilitates immediate interaction between the user and the selected network resource.

12. The system of claim 11, further comprising a rules engine implemented in the computing device, wherein the rules engine utilizes stored rules for processing the request based on at least one lead source associated with the request and matching the user with at least one of a product, an advisor, and a data transmission output.

13. The system of claim 11, further comprising a retry queue maintained by the computing device, wherein the retry queue captures a failed request and resends the request in accordance with the user priority rules.

14. The system of claim 11, further comprising a transaction logging database that logs all interaction data, wherein the logged data comprises one or more of the following: user identifiers, details of processed requests, selected network resources, utilized eligibility criteria, and timestamps of each operation for future reference and auditing.

15. The system of claim 12 wherein the rules engine includes contextual parameters usable for identifying products, identifying network resources, identifying advisors, user engagement, and making assignments.

16. The system of claim 11, further comprising a continuous improvement feedback loop implemented by the computing device, wherein feedback regarding the performance of the at least one network resource is collected and used to update the eligibility criteria stored in the eligibility criteria database.

17. The system of claim 11, wherein the computing device is configured to send alerts to relevant applications when specific events occur, the notifications being based on actions taken on the requests, the actions taken on the request comprising one or more of the following: successful selections, facilitated interactions, and processing failures.

18. The system of claim 11, wherein the computing device is configured to store historical interaction data associated with the user identifiers to identify patterns; using the historical interaction data to adapt rules to store data from upstream sources in real-time or via a queue.

19. The system of claim 11, wherein the computing device is configured to output, via at least one data transmission output, the results of the network resource selection process to one or more selected from the group consisting of a notification service, logging database, or external API for further processing.

20. A computer-implemented method for matching in real-time across at least one network resource for a new user, the method comprising:
   receiving, by at least one computing device configured with processor-executable programming instructions, from at least one other computing device operated by a new user, a request for access to a network resource;
   generating, by the at least one computing device, a credential authorizing access to the network resource for the new user;
   storing, by the at least one computing device, the credential authorizing access in a database configured to store information about users;
   authenticating, by the at least one computing device, the request by comparing the credential with information stored in the database configured to store information about users;
   assigning, by the at least one computing device, a new user identifier for the new user;
   accessing, by the at least one computing device, eligibility criteria stored in a database that define user access to respective network resources;
   determining, by the at least one computing device processing the eligibility criteria, a plurality of network resources available for the newly assigned user identifier;
   selecting, by the at least one computing device, one of the plurality of network resources available for the newly assigned user identifier; and
   facilitating, by the at least one computing device, interaction between the new user and the selected one of the plurality of network resources via a delay queue that is configured to facilitate immediate and delayed interaction;
   determining, by the at least one computing device processing user priority rules, whether to facilitate immediate or delayed interaction;
      where the result of the determining is to facilitate delayed interaction:
         delaying, by the at least one computing device, the interaction for a customizable amount of time based on the user priority rules; and
      where the result of the determining is to facilitate immediate interaction:
   facilitating, by the at least one computing device, immediate interaction between the new user and the selected one of the plurality of network resources.

* * * * *